March 17, 1953        A. A. ZUHN        2,631,810
RESILIENT SUPPORTING DEVICE
Filed Dec. 19, 1949        3 Sheets-Sheet 2
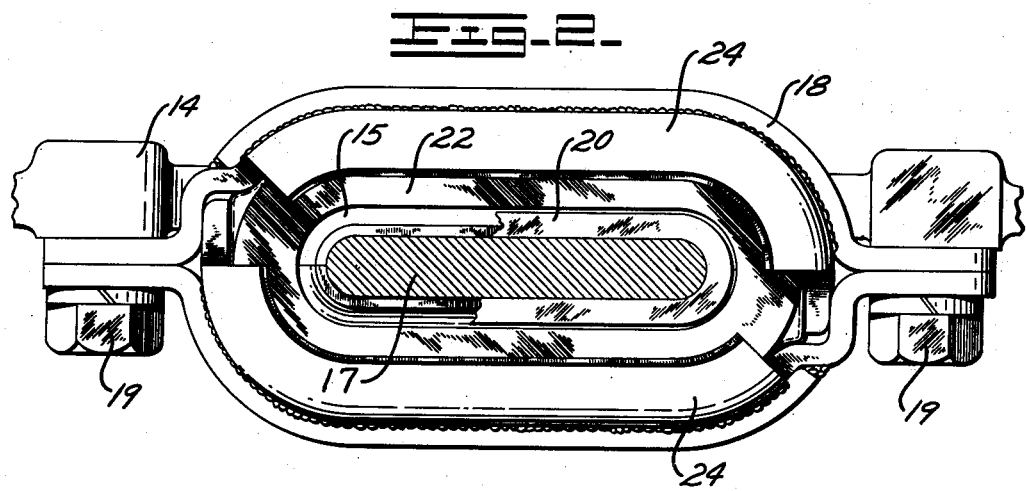
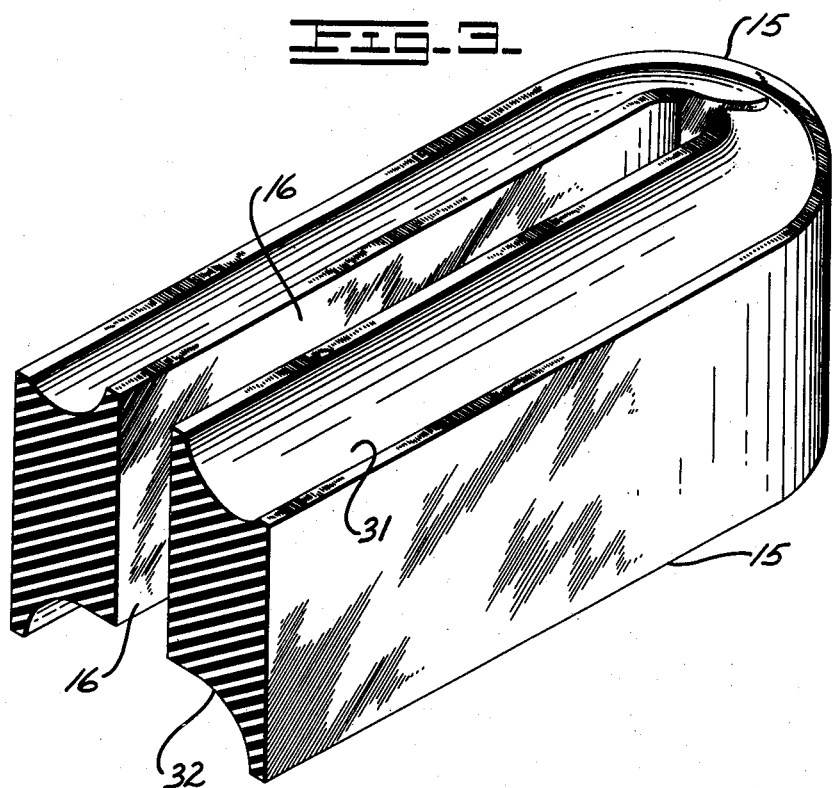
INVENTOR.
Arthur A. Zuhn
BY Charles M. Fryer
ATTORNEY.

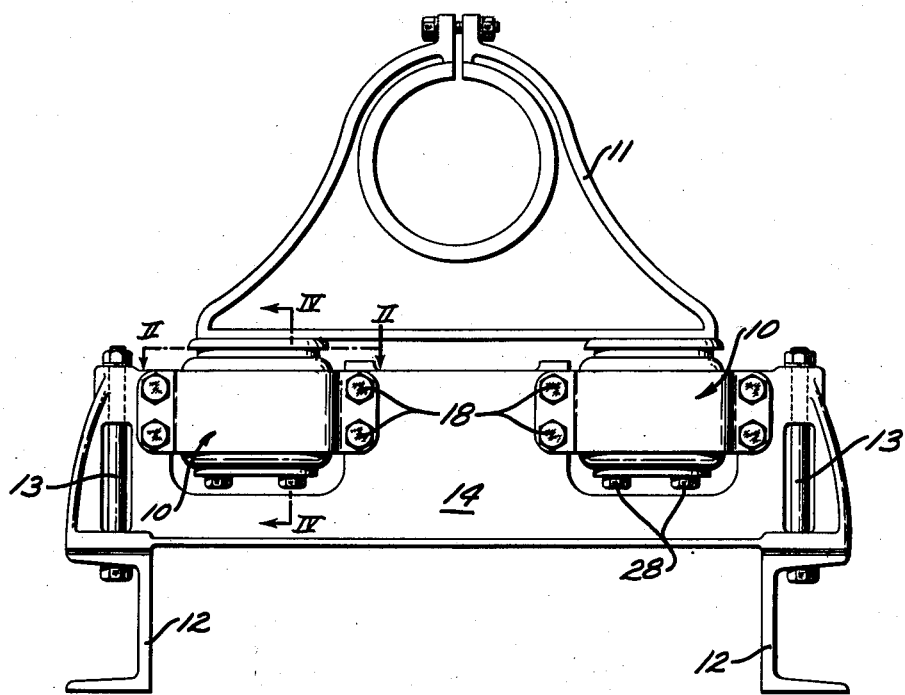

March 17, 1953  A. A. ZUHN  2,631,810
RESILIENT SUPPORTING DEVICE
Filed Dec. 19, 1949  3 Sheets-Sheet 3
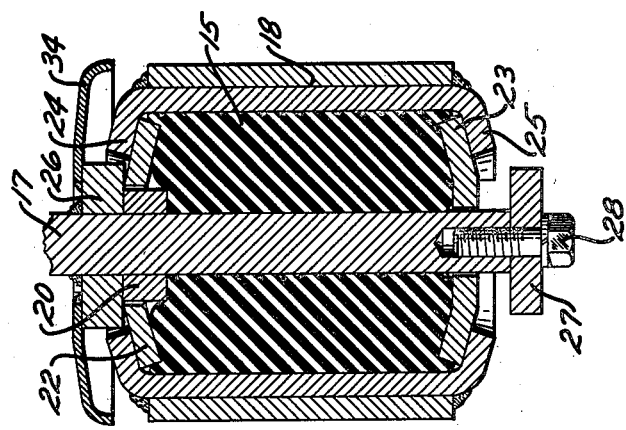
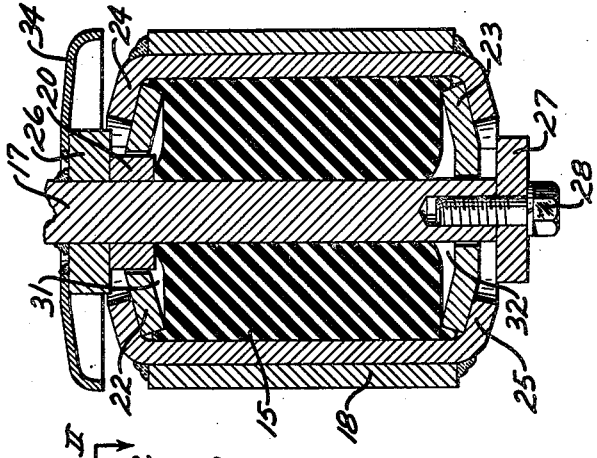
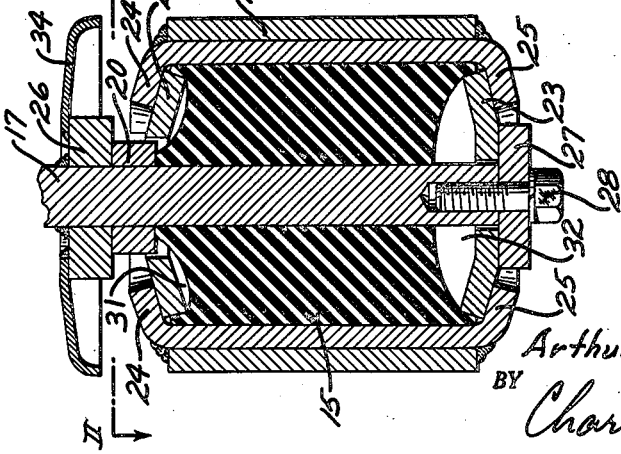
INVENTOR.
Arthur A. Zuhn
BY Charles M. Fryer
ATTORNEY Patented Mar. 17, 1953

2,631,810

UNITED STATES PATENT OFFICE 2,631,810

RESILIENT SUPPORTING DEVICE

Arthur A. Zuhn, East Peoria, Ill., assignor to Caterpillar Tractor Co., Peoria, Ill., a corporation of California Application December 19, 1949, Serial No. 133,725

1 Claim. (Cl. 248—358)

This invention relates to a resilient vibration isolating and damping support particularly adapted for use as an engine mounting or the like. The invention is disclosed herein in connection with such use, however it will be apparent that it is readily adaptable to other uses.

In a resilient vibration isolating and damping support of the type in which the resistance to shearing stress of a resilient material such as rubber is employed as a load supporting cushion, one of the principal difficulties encountered has been the provision of means to limit the maximum deflection of the support to prevent rupture of the resilient material as well as to prevent excessive misalignment of the operating machine with other connected equipment. In the past, it has been the practice to provide external bumpers or snubbers to limit the maximum deflection of the mounting necessarily complicating the manufacture and providing external parts which may become damaged reducing the effectiveness of the mounting.

It is, therefore, an object of the present invention to provide a resilient vibration isolating and damping support of the type in which the resistance to shearing stress of a resilient or elastic material is employed as a load supporting cushion, in which the resilient action is limited by means which takes advantage of the resistance of such material to compression.

It is another object of this invention to provide a resilient vibration isolating and damping support of the type described of unusually simple design which may be easily manufactured and assembled.

Other objects and advantages of this invention will be made apparent in the following specification wherein reference is made to the accompanying drawings.

In the drawings:

Fig. 1 is a view in end elevation of an engine supporting frame illustrating a typical application of a pair of resilient engine supports embodying the present invention;

Fig. 2 is a sectional view taken along the line II—II of Fig. 1 with parts broken away to more clearly illustrate the invention;

Fig. 3 is a sectional isometric view of a resilient cushion employed in the present invention;

Fig. 4 is a transverse sectional view taken along the line IV—IV of Fig. 1 illustrating the various parts in the positions they would assume when the support is in its free or unloaded state;

Fig. 5 is a view similar to Fig. 4 with the various parts shown in the positions they would assume under normal operating loads; and Fig. 6 is a view similar to Fig. 4 illustrating the various parts in the positions they would assume under maximum load.

Fig. 1 illustrates a typical application of a pair of resilient mountings 10 embodying the present invention. The mountings are interposed between a collar 11 adapted to be secured in a conventional manner to an internal combustion engine to be supported, not shown, and a supporting frame comprising a pair of spaced channel members 12 to which are secured as by bolts 13 a cross frame member 14. The mountings serve to isolate and damp the vibration normally present in an internal combustion engine preventing its transmission to the supporting structure.

As is best illustrated in Figs. 2, 3 and 4, each of the resilient mounts comprises a cushion 15 of a resilient material, such as rubber, having a central opening 16 for the reception of a load carrying member 17 which may be rigidly secured to or formed integrally with the collar 11. A separable case 18 embraces the cushion 15 and is clamped to compress the cushion by cap screws 19. The cap screws also serve to secure the case to the frame member 14. The degree of compression is sufficient to create friction between the cushion 15 and the load supporting member 17 as well as between the cushion 15 and the case 18 to prevent slipping under load and thus to absorb the load by the resistance to shearing stress of the resilient cushion. This provides a soft easily deflected mounting desirable to isolate and damp the vibration of the engine during normal operation. It is, however, desirable to limit its maximum deflection to prevent overstressing of the resilient cushion as well as to prevent excessive misalignment between the engine and its connected parts. To accomplish this, two thrust washers 22 and 23 are disposed on opposite sides of the cushion. The washers are provided with central openings to accommodate the load carrying member and are held in place by inwardly extending flanges 24 and 25 formed at the open ends of the separable case 18. As is best illustrated in Fig. 6, excessive deflection of the mounting in a downward direction is prevented by an abutment in the form of a collar-like member 26 welded to the load carrying member 17 and adapted to engage the washer 22 to limit deflection by imposing the load on the cushion 15 in compression. As the material of the cushion, confined as it is by the case 18 and washers 22 and 23, has very little compressibility, an excellent snubbing action is obtained. A spacer 20 is disposed between the collar 26 and the cushion 15 to prevent the snubbing or limiting contact of the collar 26 and washer 22 until the required amplitude of deflection has occurred. A similar limit to upward deflection of the load is accomplished by a plate 27 secured as by screws 28 to the load carrying member for contact with the washer 23. The necessary spacing is provided by distortion under normal load as shown in Fig. 5. Thus, under normal operation, the weight of the engine and all vertical vibration are opposed by the resistance to shearing stress of the resilient cushion to provide a relatively soft and flexible support though the limit to the magnitude of vibration is imposed upon the same cushioning element in a manner to take advantage of its less compressible characteristics.

The ends of the cushion 15 are recessed as indicated at 31 and 32 in Fig. 3 to prevent interference with thrust washers 22 and 23 when the cushion is deflected to its normal operating position as is illustrated in Fig. 5. The manner in which the ends of the cushion are shaped provides a high inside edge at the top and a low outside edge at the bottom so that upon confining of the cushion by the structure which embraces it as shown in Fig. 4, it is distorted or preloaded for reception of the weight that it is intended to support. Preferably a shield 34 is carried by the collar 26 to exclude the entrance of oil and dirt into the case 18.

One of the advantages of this invention resides in use of the separable case for compressing the cushion element and obtaining the friction necessary to support a load and utilize the shear resistance of the resilient material without the necessity of pressing a large section of rubber into a confined space or utilizing methods for bonding rubber to metal.

I claim:

A resilient supporting device comprising a load carrying member, a resilient cushion embracing said member, a case surrounding said cushion and compressing it against the load carrying member, said case having inwardly flanged ends overlying the ends of the cushion, washer-like members surrounding the load carrying member between the cushion and the flanged ends of the case, and collars on the load carrying member normally spaced from the washer-like members but engageable each with one of the washer-like members upon movement of the load carrying member in opposite directions to compress the cushion member after it has been subjected to shearing stress.

ARTHUR A. ZUHN.

REFERENCES CITED

The following references are of record in the file of this patent:

UNITED STATES PATENTS

| Number | Name | Date |
| --- | --- | --- |
| 1,830,118 | Lord | Nov. 3, 1931 |
| 2,128,733 | Riesing | Aug. 30, 1938 |
| 2,147,660 | Loewus | Feb. 21, 1939 |
| 2,328,614 | Busse | Sept. 7, 1943 |
| 2,412,838 | Shores | Dec. 17, 1946 |
| 2,463,059 | Saurer | Mar. 1, 1949 |
| 2,560,098 | Fernstrum | July 10, 1951 |

FOREIGN PATENTS

| Number | Country | Date |
| --- | --- | --- |
| 401,744 | Great Britain | Nov. 20, 1933 |
| 407.788 | Great Britain | Mar. 29, 1934 |
| 430,918 | Great Britain | June 27, 1935 |